United States Patent [19]

Perazzella

[11] 3,759,067

[45] Sept. 18, 1973

[54] SHAFT COUPLING WITH SLIDING PLATE
[75] Inventor: Frank W. Perazzella, Wolcott, Conn.
[73] Assignee: North American Philips Corporation, New York, N.Y.
[22] Filed: Feb. 27, 1970
[21] Appl. No.: 15,031

[52] U.S. Cl. .................................................. 64/31
[51] Int. Cl. .............................................. F16d 3/04
[58] Field of Search .......................................... 64/31

[56] References Cited
UNITED STATES PATENTS
2,756,573   7/1956   Colby et al. ............................ 64/31
3,116,619   1/1964   Spielbaur ................................ 64/31

Primary Examiner—Edward G. Favors
Attorney—Donald P. Gillette

[57] ABSTRACT

A shaft coupling to transmit rotation from one shaft to another not co-linear therewith. The coupling comprises a plate which is transverse to one of the shafts and connected thereto, the plate having limited freedom of movement back and forth in one direction transverse to the other shaft, and fitting over a promontory on the one shaft which is disposed within a slot in the plate so as to allow movement only in one direction. A finger on the other shaft intersects grooves in the plate to complete the coupling. A motor connected through a gear train may be used to rotate one of the shafts.

3 Claims, 2 Drawing Figures

Patented Sept. 18, 1973

INVENTOR.
FRANK W. PERAZZELLA

BY Donald P. Gillett

ATTORNEY

Patented Sept. 18, 1973

INVENTOR.
FRANK W. PERAZZELLA

BY *Donald P. Gillette*

ATTORNEY

SHAFT COUPLING WITH SLIDING PLATE

FIELD OF THE INVENTION

The invention relates to shaft couplings and more particularly to universal joints which are used to transmit rotation from one shaft to another where the two shafts may not be co-linear. Specifically the present invention may be used in electrical components of radios or television sets where the shafts of control elements must be coupled together, and may be used, for example, where it is desirable to drive a standard potentiometer with an electric motor.

BACKGROUND OF THE INVENTION

It often arises that the shaft of the motor and that of the potentiometer will be either axially or angularly displaced from each other to a small degree because of the loose tolerances in mass production of motor-driven potentiometers for consumer products like television sets. In this situation means must be provided to couple the two shafts together in such a way that there is sufficient flexibility in the joint to allow for the mismatch, and yet, to maintain an efficient connection.

It should be understood that the present invention is in no way intended to be limited to use with the above described electrical components, and may be used generally in any situation wherein matching of a pair of non co-linear rotating shafts is necessary.

BRIEF DESCRIPTION OF THE INVENTION

The present invention uses a disc which is transverse to one of the shafts and mounted thereon in such a way as to have limited freedom of movement back and forth in one direction transverse to the axis of rotation. The disc is provided with a slot which lies substantially along one diameter thereof, for the purpose of fitting over a promontory which juts out from the shaft and is disposed within the slot in such a way as to allow limited movement of the disc in one direction. The disc is also provided with a pair of additional slots which are diametrically opposite each other and preferably lie along the periphery of the disc. These slots are to be intersected by a U-shaped finger which is located on the other shaft. One purpose of the pair of diametrically opposed slots is to provide for a second direction of movement of the disc with respect to the other shaft substantially perpendicular to the first named direction. The present invention, therefore, makes it possible to accommodate two shafts which may be either laterally or angularly displaced to a limited extent with respect to each other.

One object of the present invention is to provide a shaft coupling to transmit rotation from one shaft to another not colinear therewith.

Another object of the present invention is to provide a shaft coupling which is simple to construct and to assemble.

Still another object of the present invention is to provide a shaft coupling which is inexpensive to manufacture or otherwise utilize.

BRIEF DESCRIPTION OF THE DRAWINGS

For a further understanding of the present invention, reference may be had to the accompanying drawings in which.

BRIEF DESCRIPTION OF THE PREFERRED EMBODIMENTS

Figure 1:
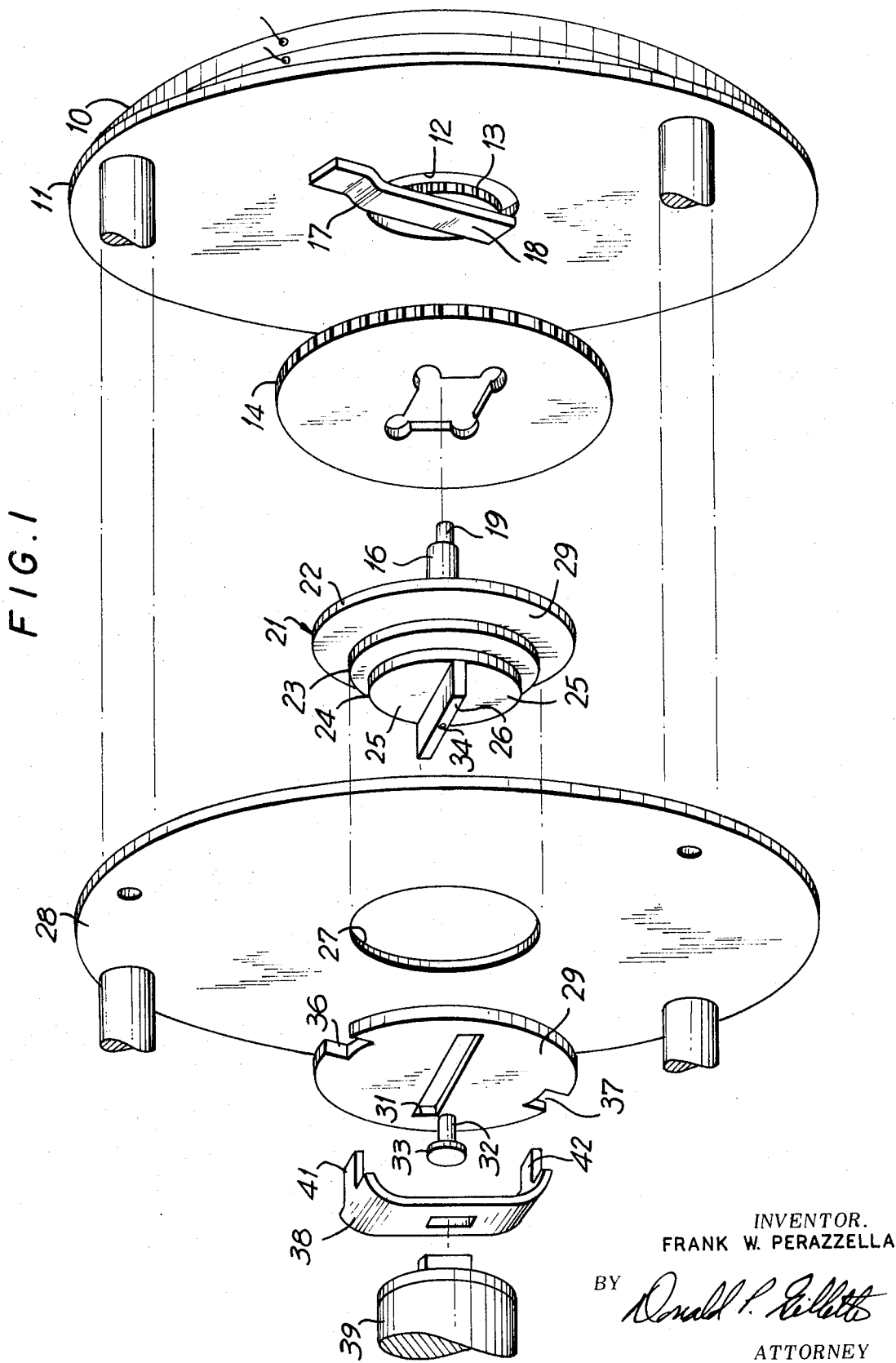
FIG. 1 is an exploded view of the present invention showing the relationship between the various components.

Referring now to the drawings, FIG. 1 depicts an operational arrangement of the components of the present invention, although it is to be understood that the present invention is not to be limited, for example, to use with an electric motor 10. In this particular embodiment, the motor is mounted on a support plate 11 which has a hole 12 in its center. The drive shaft of the motor extends into the hole 12, and mounted thereon is a drive pinion 13 which, under the present circumstances, will normally be meshed into a standard gear train (not shown) which will provide the desired step-up or step-down ratio to control the final output rotational speed. One gear wheel 14 of the gear train is shown, and it is to be staked in a known manner to a shaft 16 which is to be rotated at a predetermined speed. The hole 12 is protected by a somewhat L-shaped finger 17 which is integral with the plate 11 and substantially covers the hole. Its purpose is to provide an abutment surface 18 for one end 19 of the shaft 16. In the illustrated embodiment, the shaft 16 is not connected to the finger 17, but merely abuts it at its flat portion 18, the finger being strong enough to support the pressure of the shaft 16 when the mechanism is in its assembled state.

One end of the shaft 16 is provided with a three level stepped configuration transverse to the axis of rotation, and generally denoted by the reference numeral 21. As shown in FIG. 1, the diameter of the inner level 22 is the largest, with the remaining levels, 23 and 24 being successively smaller. In the present embodiment of the invention, the stepped configuration and the shaft 16 are unitary and formed of an appropriate substance, such as, for example, lightweight metal of some desired type.

The outer lever 24 comprises an integral and substantially rectangular promontory 26 which extends axially from the flat end 25 of the level 24 toward a second shaft, 39, to be more fully explained below. The length of the promontory 26 is equal to that of a diameter of the level 24, and the promontory is colinear with that part of the shaft 16 which abuts the finger 17. The promontory 26 and the stepped configuration 21 are to fit through an opening 27 in a second support plate 28 until the level 22 abuts the surface of the disc 22. The diameter of the opening 27 in the plate 28 is the same as that of the middle level 23, so that when the device is assembled, the level 24 extends beyond the outer surface of the plate, while the level 22 remains against the surface. The disc 23 therefore acts an a bearing on which the shaft 16 will rotate in the opening 27.

Figure 2:
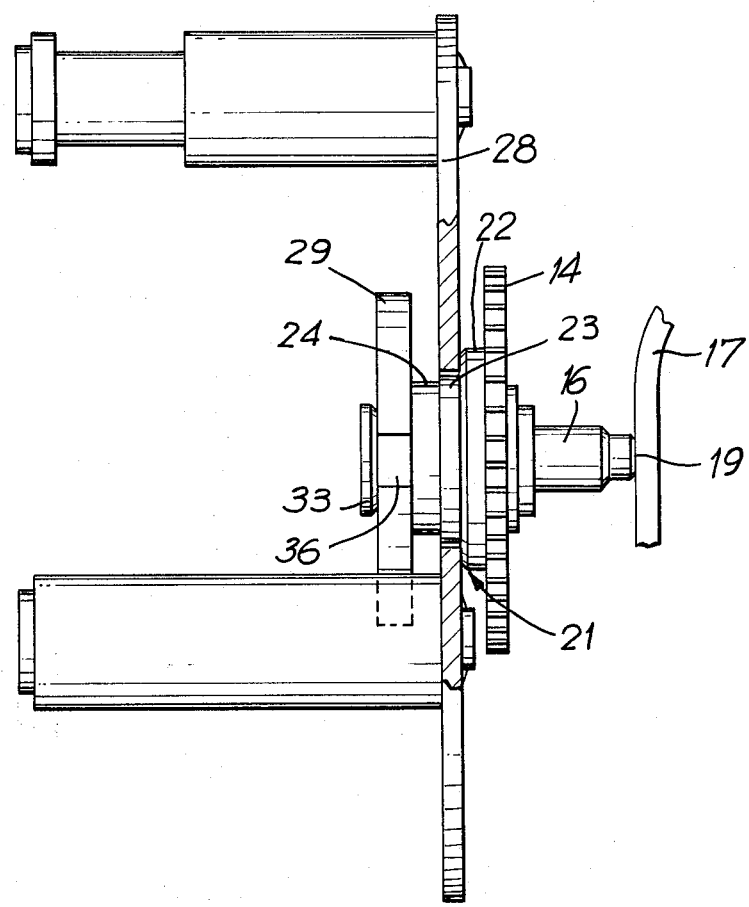
FIG. 2 is a side view of the device assembled in accordance with the present invention.

This arrangement may be seen best in FIG. 2, which shows the device in its assembled form and illustrates that the inner level 22 of the stepped configuration serves as a spacer between the gear wheel 14 and the plate 28 to enable the gear wheel, which will be driven by the motor 10, to turn efficiently and smoothly with a minimum of friction. It may also be seen from FIG. 2 that the purpose of the level 24 is to separate the plate 28 from a plate or disc 29 which is to be mounted on the shaft 16 on the opposite side of the plate 28 from the gear wheel 14. The disc 29, which rests against the flat end 25 that is spaced from the plate 28 when the shaft end 19 is in contact with the finger 17, has a central rectangular opening 31 which lies part way along one diameter of the disc and is longer than the promontory 26 on the shaft 16 although having substantially the same width. The thickness of the disc 29 is preferably no greater than the axial length of the promontory 26. The opening is arranged to fit over the promontory with the result that the disc 29 will have a limited freedom of movement back and forth in one direction along the promontory transverse to the axis of rotation of the shaft 16. A rivet 32 having a head 33 which has a diameter greater than the width of the opening 31 extends through the opening 31 and is forced into a bore 34 in the promontory to hold the disc 29 in position on the shaft 16. The rivet will prevent the disc 29 from disengaging from the promontory but will not preclude the disc from moving laterally back and forth in one direction. The result is that as the gear 14 is turned by the motor 10, the shaft 16 will rotate on its bearing 23 in the opening of the plate 28. Since the disc 29 is non-rotatably mounted on the promontory, it too will rotate along with the shaft 16, but will remain free to slide back and forth along the promontory in a direction transverse to the axis of rotation of the shaft.

Also provided in the disc 29 is a pair of slots 36 and 37 diametrically opposite each other along the periphery of the disc. A generally U-shaped finger 38 is non-rotatably mounted on a second shaft 39 in a known manner and comprises a pair of prongs 41 and 42 to engage, respectively, the slots 36 and 37 of the disc 29, thereby to enable the transmission of rotary movement of the disc to the second shaft.

The present invention is able to accommodate to each other two shafts which may be either axially or angularly offset from one another. Lateral displacement of the two shafts may be accommodated by the back and forth sliding movement of the disc along the promontory, while some angular displacement will be reconciled by the freedom of movement of the prongs 41 and 42 respectively, within the slots 36 and 37.

It should be noted that the slots 36 and 37 are also necessary to reconcile lateral displacement of the two shafts. If, for example, in FIG. 1, the second shaft 39 were to be offset from the shaft 16 axially in either direction along the length of the opening 31, as the disc 29 rotated one quarter turn, the alignment of the prongs 41 and 42 within the slots 36 and 37 would change, with respect to the disc, in a second direction substantially perpendicular to the direction of back and forth movement along the promontory of the disc. The slots 36 and 37 are important insofar as they allow sufficient freedom in the connection between the the disc 29 and the finger 38 to offset the effects of either an axial or angular displacement between the two shafts 16 and 39.

What is claimed is:

1. A shaft coupling comprising:
   a first shaft;
   a second shaft to be linked with said first shaft;
   a transverse plate non-rotatably mounted on said second shaft and having limited freedom of movement back and forth in one direction transverse to said first shaft; and
   a U-shaped finger non-rotatably mounted on said first shaft and engaging said plate with limited freedom of movement with respect to said plate in a second direction transverse to said first shaft to transmit movement between said first shaft and said second shaft.

2. The coupling of claim 1 in which the prongs of said finger intersect said plate in corresponding grooves.

3. The coupling of claim 2 in which said grooves comprise a pair of slots diametrically opposite each other along the periphery of said plate.

* * * * *